United States Patent [19]

Tsuchiya et al.

[11] Patent Number: 5,558,579

[45] Date of Patent: Sep. 24, 1996

[54] TORSIONAL DAMPER HAVING A RESILIENTLY COUPLED DAMPER ELEMENT AND A FRICTION GENERATING DEVICE MOUNTED WITHIN A PADDED WINDOW OF THE DAMPER ELEMENT

[75] Inventors: Shouichi Tsuchiya; Tatsuya Morishita; Masanori Koda, all of Atsugi; Atsuhiro Mori, Yokosuka; Takashi Murasugi, Ebina, all of Japan

[73] Assignees: Unisia Jecs Corporation, Atsugi; Nissan Motor Co., Ltd., Yokohama, both of Japan

[21] Appl. No.: 301,568

[22] Filed: Sep. 7, 1994

[30] Foreign Application Priority Data

Sep. 7, 1993 [JP] Japan .................................... 5-222358

[51] Int. Cl.$^6$ .................................. F16D 3/12; F16D 3/14
[52] U.S. Cl. ................................. 464/64; 464/68; 464/85
[58] Field of Search .................................. 464/64, 68, 66, 464/85; 192/106.2; 74/574

[56] References Cited

U.S. PATENT DOCUMENTS

| 4,560,054 | 12/1985 | Kayanoki et al. | 192/106.2 |
|---|---|---|---|
| 4,573,562 | 3/1986 | Deland | 192/106.2 |
| 4,782,933 | 11/1988 | Jackel et al. | 192/70.18 |
| 4,856,638 | 8/1989 | Roth et al. | 192/106.1 |
| 4,904,225 | 2/1990 | Worner et al. | 464/67 |
| 4,950,205 | 8/1990 | Umeyama | 464/64 X |
| 4,972,734 | 11/1990 | Hyodo et al. | 74/574 |
| 4,976,656 | 12/1990 | Bacher et al. | 192/106.2 X |
| 5,139,124 | 8/1992 | Friedmann | 192/48.3 |
| 5,245,889 | 9/1993 | Kohno et al. | 74/573 |
| 5,269,725 | 12/1993 | Maucher et al. | 464/68 |

FOREIGN PATENT DOCUMENTS

| 0406832 | 1/1991 | European Pat. Off. . |
|---|---|---|
| 2381206 | 9/1978 | France . |
| 2386728 | 11/1978 | France . |
| 48-69936 | 9/1973 | Japan . |

*Primary Examiner*—Daniel P. Stodola
*Assistant Examiner*—Emmanuel M. Margelo
*Attorney, Agent, or Firm*—Foley & Lardner

[57] ABSTRACT

A torsional damper comprises damper elements which are resiliently coupled by a spring arrangement and a friction generating device. One of the damper elements has a radially extending wall. The friction generating device includes a plurality of friction blocks received by the other damper element with play in the circumferential direction, and a spring arranged to bias the plurality of friction blocks against the radially extending wall. In order to absorb the shock of engagement of each of the plurality of friction blocks with the other damper element, a cushion is provided.

11 Claims, 5 Drawing Sheets

5,558,579

TORSIONAL DAMPER HAVING A RESILIENTLY COUPLED DAMPER ELEMENT AND A FRICTION GENERATING DEVICE MOUNTED WITHIN A PADDED WINDOW OF THE DAMPER ELEMENT

BACKGROUND OF THE INVENTION

The present invention relates to a torsional damper of the type having damper elements resiliently coupled by a spring arrangement and a friction generating device.

U.S. Pat. No. 4,904,225 issued to Worner et al., on Feb. 27, 1990 discloses damper elements coupled by a spring arrangement. The spring arrangement has an intermediate support which is connected resiliently to one damper element by long-stroke arcuate helicoidal springs and to the other damper element by short-stroke springs. Additionally, a friction generating device or slip coupling which exhibits play is also arranged. The friction generating device is operative to generate friction resistance which counteracts the movement of the damper elements.

Japanese Patent Application First Publication (JP-A) No. 48-69936 discloses a torsional damper in the form of a clutch disc. According to this known torsional damper, there is provided a friction generating device which includes a thrust plate provided with a plurality of fingers. The plurality of fingers are received in windows of a sub-plate and have, within the corresponding windows, a play in the circumferential direction.

There is a need for eliminating noise occurring during operation of the friction generating device.

An object of the present invention is to provide a torsional damper with improved noise free operational behavior of a friction generating device.

SUMMARY OF THE INVENTION

According to the present invention, there is provided a torsional damper comprising:

first and second damper elements which are resiliently coupled by a spring arrangement;

said first damper element having a radially extending wall; and a friction generating device which includes a plurality of friction blocks received by said second damper elements with a play in the circumferential direction of said second damper element, and a spring acting between said first damper element and said plurality of friction blocks to bias said plurality of friction blocks against said radially extending wall of said first damper element, wherein said friction generating device has a cushion arranged to absorb the shock of engagement of said plurality of friction blocks with said second damper element.

DETAILED DESCRIPTION OF THE INVENTION

Figure 1:
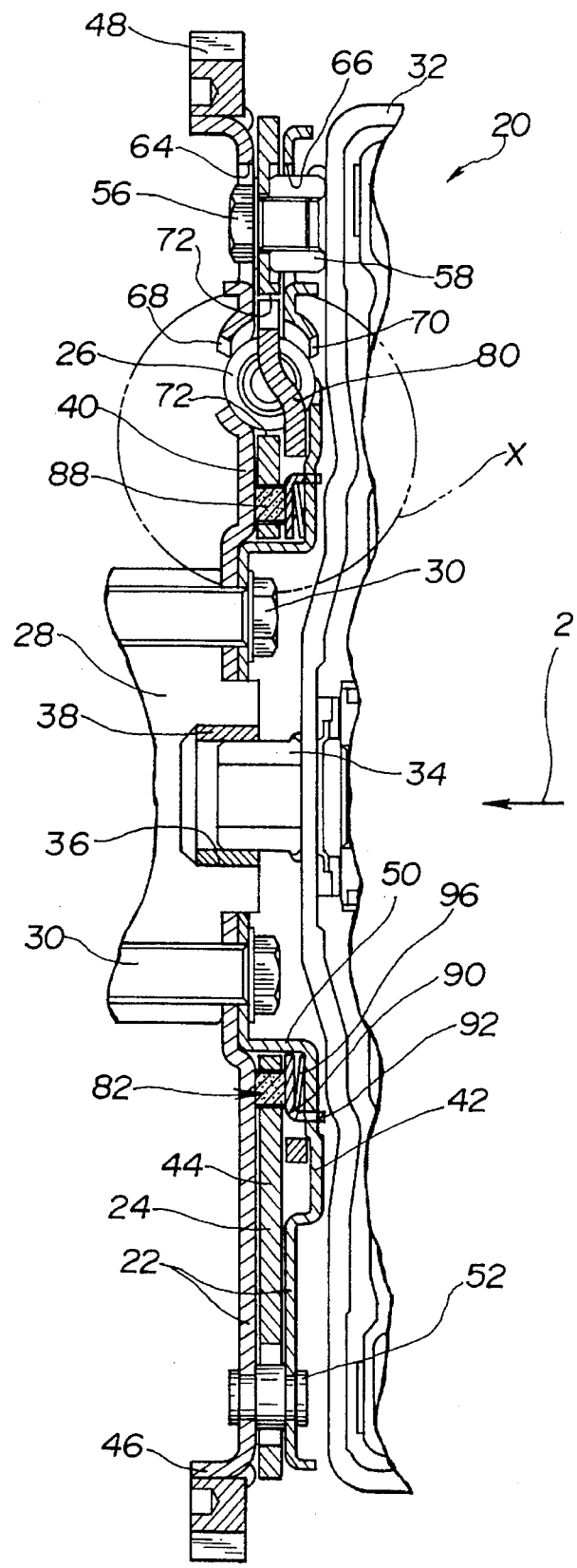
FIG. 1 is an axial section taken through the line 1—1 in FIG. 2, showing a preferred embodiment of a torsional damper according to the present invention.

Referring to FIGS. 1 to 6, there is shown a torsional damper 20 which comprises two coaxial damper elements, namely a driver damper element 22 and a driven damper element 24, which are resiliently coupled together by a spring arrangement 26. The driver damper element 22 is affixed to a crankshaft 28 of an internal combustion engine by a set of axially parallel bolts 30, and the driven damper element 24 can transmit torque to an input element (converter cover) 32 of a torque converter which can in turn transmit torque to an input element (turbine shaft) of an automatic transmission, not shown. The converter cover 32 is drivingly connected to a pump impeller, not shown, of the torque converter in a known manner, and has at its center a circular protuberance 34 received in a central opening 36 of the crankshaft 28 by means of a bushing 38.

The driver damper element 22 includes two annular plates, namely, a first or driver plate 40 and a second or side plate 42, while the driven damper element 24 includes an annular disc 44. The driver and side plates 40, 42 have their radially innermost portions secured to an annular axial end of the crankshaft 28 around the central opening 36. The driver plate 40 carries at its rim 46 a ring gear 48 adapted to mate with an output gear of a starter motor, not shown. The side plate 42 has an axially extending collar portion 50 adjacent its radially innermost portion. The driver and side plates 40, 42 are fixedly secured to each other by a set of distancing elements in the form of rivets 52. The rivets 52 ensure that the plates 40, 42 are held at a predetermined axial distance from each other. Received by the space between the driver and side plates 40, 42 is the annular disc 44 having its inner periphery facing and opposed to axially extending surface of the collar portion 50. The annular disc 44 is formed with a set of circumferentially spaced arcuate slots 54 receiving the rivets 52, respectively. The annular disc 44 is affixed to the converter cover 32 by a set of bolts 56 threadedly engaged with tapped rings 58 fixedly secured to the converter cover 32. The bolts 56 and arcuate slots 54 are alternately arranged. Coaxial relation between the damper elements 22, 24 is maintained by the bushing 38 rotatably supporting the converter cover 32. No bearing is thereby used between the damper elements 22, 24.

Figure 2:
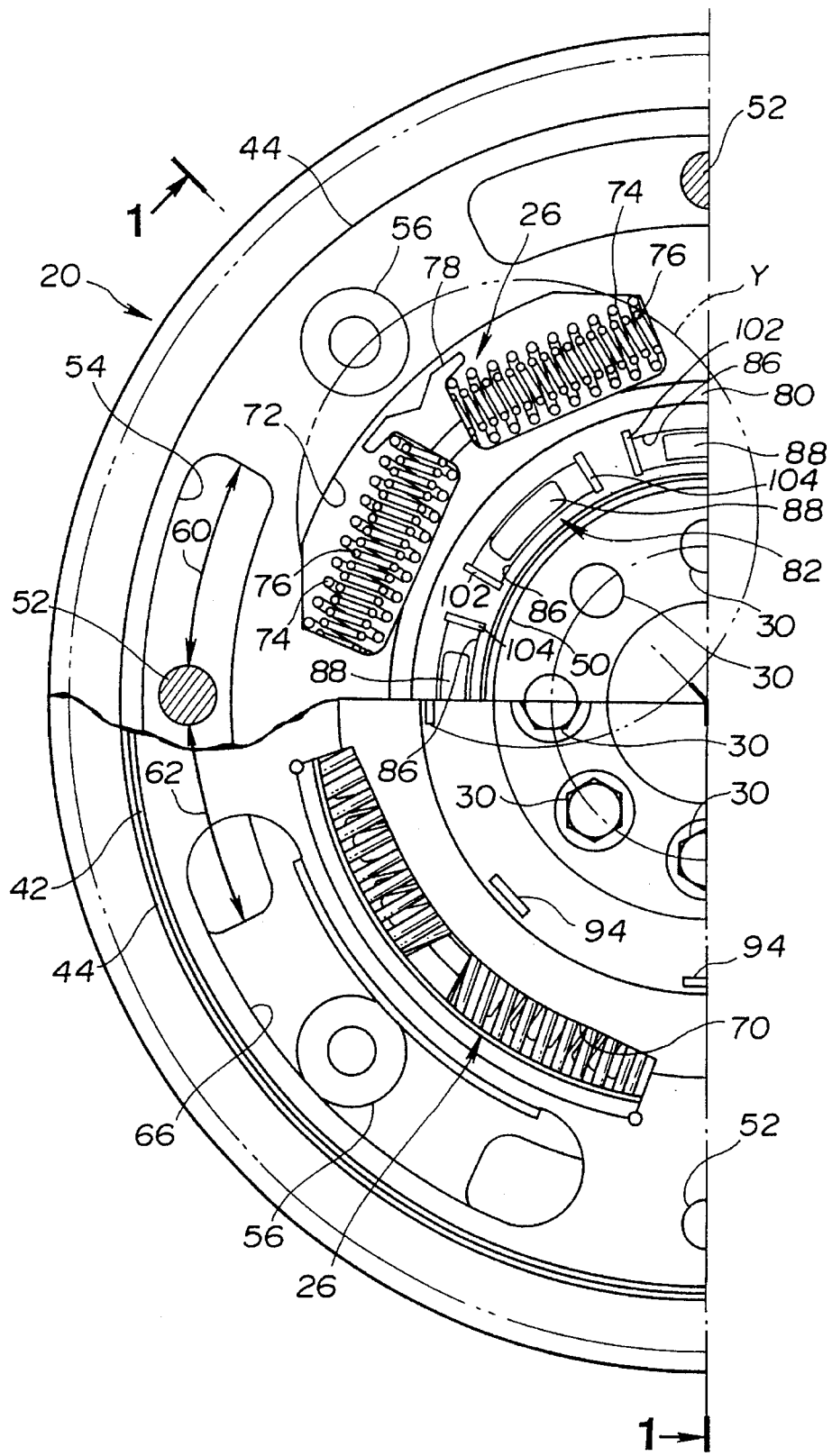
FIG. 2 is a fragmentary elevational view of the torsional damper as seen in the direction of arrow 2 in FIG. 1 with a converter cover and a part of a driven damper element omitted.

The damper elements 22, 24 are rotatable relative to each other within an angle corresponding to the gap 60+62 (see FIG. 2). The driver and side plates 40, 42 are formed with openings 64, 66, respectively, to avoid interference between the plates 40, 42 and the bolts and rings 56, 58 during the relative rotation between the damper elements 22, 24.

The plates 40, 42 are formed with windows 68, 70 which register with windows 72 in the disc 44 to receive energy storing elements in the form of coil springs 74, 76. Extending into the windows 72 in the disc 44 are radially projecting arms 78 of a floating type spring retainer ring 80. As best seen in Fig. 2, each of the windows 72 receives a set of coil springs 74 which are separated by the corresponding arm 78. Also received in each of the windows 72 are a set of coil springs 76 which are disposed in the corresponding coil springs 74 and separated by the corresponding arm 78. These coil springs 74 and 76 are received in the windows 68, 70 of the plates 40, 42 too, and oppose angular displacements of the plates 40, 42 relative to the disc 44 and vice versa. The windows 68, 70 of the plates 40, 42, windows 72 in the disc 44, coil springs 74 and 76 and spring retainer ring 80 thereby constitute the spring arrangement 26 which resiliently couples the damper elements 22, 24.

Figure 3:
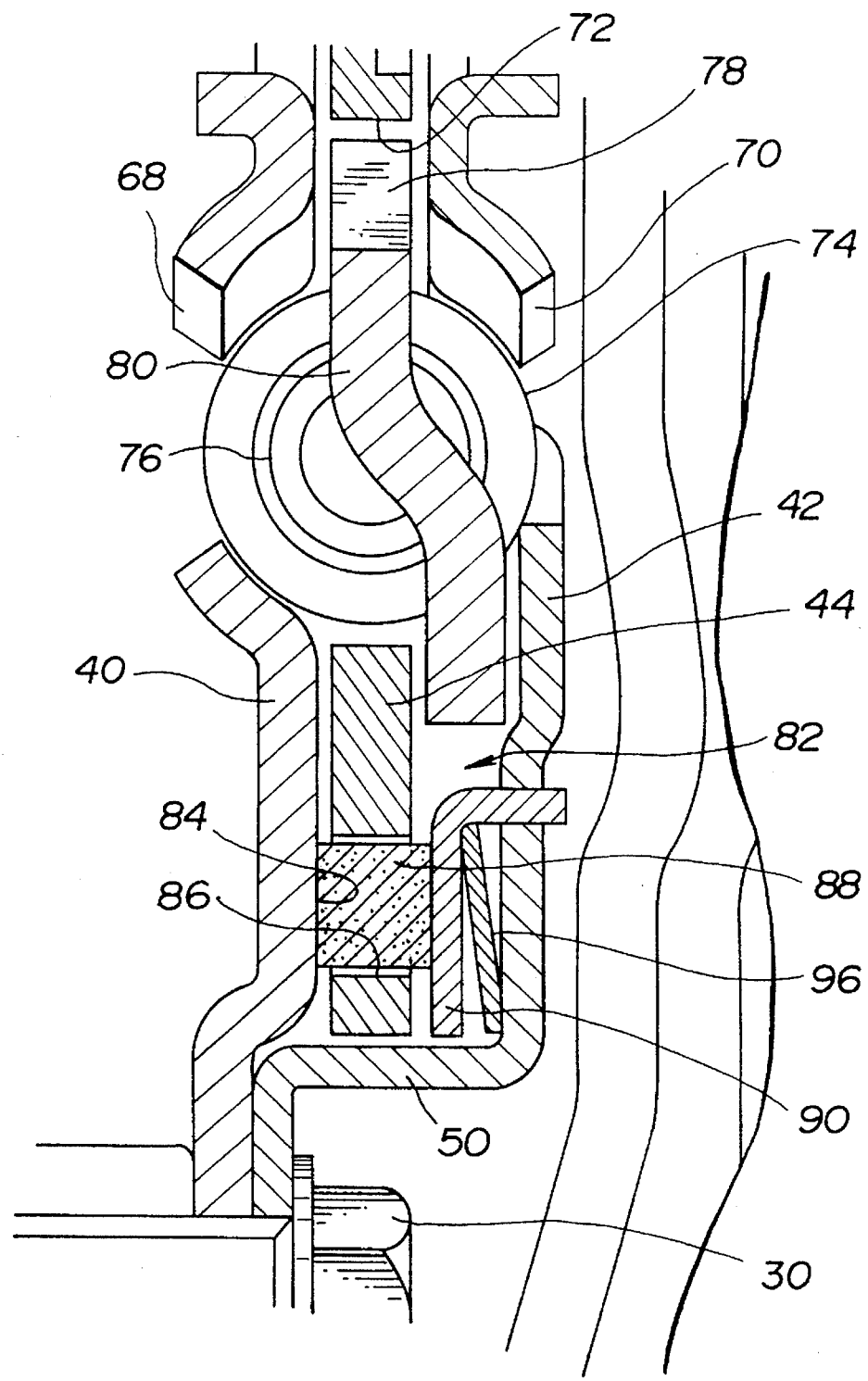
FIG. 3 is an enlarged view of the detail within the phantom-line circle "X" in FIG. 1.
Figure 4:
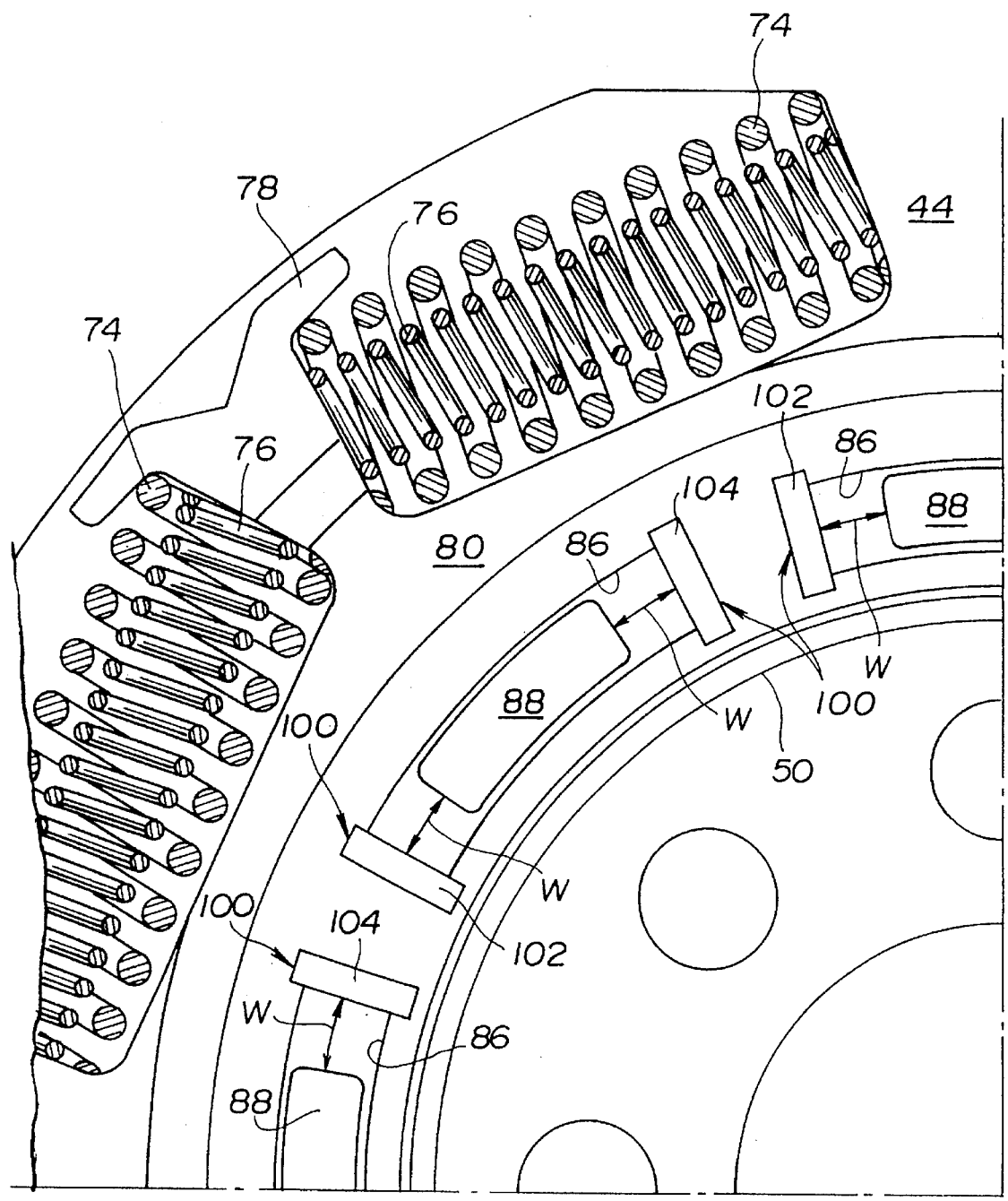
FIG. 4 is an enlarged view of the detail within the phantom-line circle "Y" in FIG. 2.

As seen in FIGS. 3 and 4, the torsional damper 20 further comprises a friction generating device 82. The friction generating device 82 surrounds the collar portion 50 of the driver damper element 22 and is disposed between a radially extending wall or surface 84 of the driver plate 40 and an inner face of the side plate 42. The annular disc 44 has on its internal circumference portion, which surrounds the collar portion 50 and is disposed between the radially extending wall 84 and the inner face of the side plate 42, windows 86 which receive friction blocks 88. The windows 86 are spaced in a circumferential direction of the disc 44. The friction blocks 88 within the windows 86 abut the radially extending wall 84 of the driver plate 40. The friction blocks 88 cooperate by their end faces remote from the radially extending wall 84 with a friction ring 90. The friction ring 90 is arranged axially slidably on the collar portion 50 and maintained firmly against rotation relative to the driver damper element 22 by means of lugs 92 at the periphery of the friction ring 90. The lugs 92 engage into slots 94 in the side plate 42. An annular plate spring 96 is clamped axially between the side plate 42 of the driver damper element 22 and the friction ring 90. The plate spring 96 biases the friction ring 90 against the friction blocks 88, and the friction blocks 88 against the radially extending wall 84 of the driver plate 40 of the driver damper element 22. The plate spring 96 presses the friction ring 90 and the driver plate 40 together.

The friction generating device 82 comprises a cushion 100 arranged to absorb the shock of mechanical engagement of the friction blocks 88 with the disc 44. The cushion 100 includes a plurality pairs of pads 102 and 104, each pair being attached, respectively, to circumferentially spaced edges of the disc 44 defining one of the windows 86. The blocks 88 have, between the corresponding pairs of pads 102 and 104, a play 2W in the circumferential direction of the disc 44. The pads 102 and 104 are made of a low rigid material. Specifically, the low rigid material is felt tissue of para aromatic polymide fiber.

As soon as the disc 44 of the driven damper element 24 is rotated relative to the driver damper element 22 far enough to consume the movement play each of the friction blocks 88 in the corresponding window 86, the disc 44 of the driven damper element. 24 entrains all of the friction blocks 88 in its further movement. During the further movement of the driven damper element 24 relative to the driver damper element 22, the frictional resistance counteracts the movement of the disc 44 relative to the driver plate 40 and the friction ring 90 in addition to the resistance offered by the spring arrangement 26.

In operation of the friction generating device 82, the disc 44 does not directly strike, by its edge defining the window 86, the corresponding friction block 88 owing to the provision of the pads 102 and 104. Thus, the cushion 100 is effective to eliminate or at least suppress occurrence of noise and to reduce risk of damage or wear of the friction blocks 88.

Figure 5:
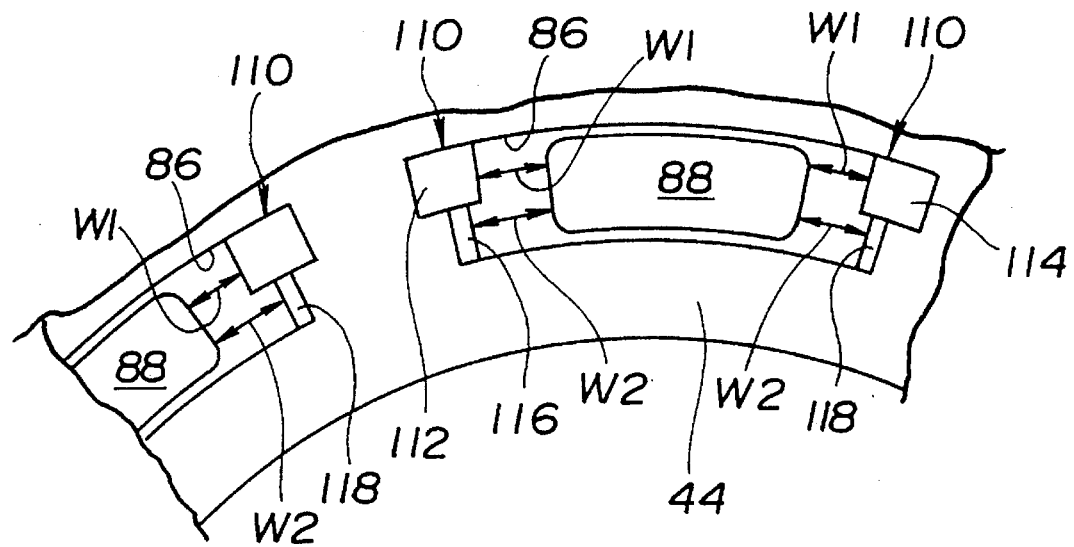
FIG. 5 is a fragmentary view of a second embodiment.

Referring to FIG. 5, another form of a cushion 110 is explained. The cushion 110 includes a plurality of pairs of first pads 112 and 114, each pair being attached, respectively, to circumferentially spaced edges of a disc 44 defining the corresponding one of a plurality of windows 86. The cushion 110 also includes a plurality of pairs of second pads 116 and 118, each pair being attached, respectively, to the circumferentially spaced edges defining one of the plurality of windows 86. The friction blocks 88 have, between the corresponding pairs of first pads 112 and 114, a play 2×W1, in the circumferential direction of the disc 44. The friction blocks 88 have, between the corresponding pairs of second pads 116 and 118, a second play 2×W2, which is longer than the first mentioned play 2×W1, in the circumferential direction of the disc 44. The first pads 112 and 114 are less rigid than the second pads 116 and 118. The first and second pads 112, 114, 116 and 118 are made of felt tissue of para aromatic polyamide fiber. The first pads 112 and 114 are resilient enough to allow the second pads 116 and 118 to directly engage the corresponding friction blocks 88. In operation, the first pads 112 and 114 are responsible for a first stage of shock absorption, and the first and second pads 112 & 114 and 116 & 118 are, in cooperation with each other, responsible for the subsequent second stage of the shock absorption.

Figure 6:
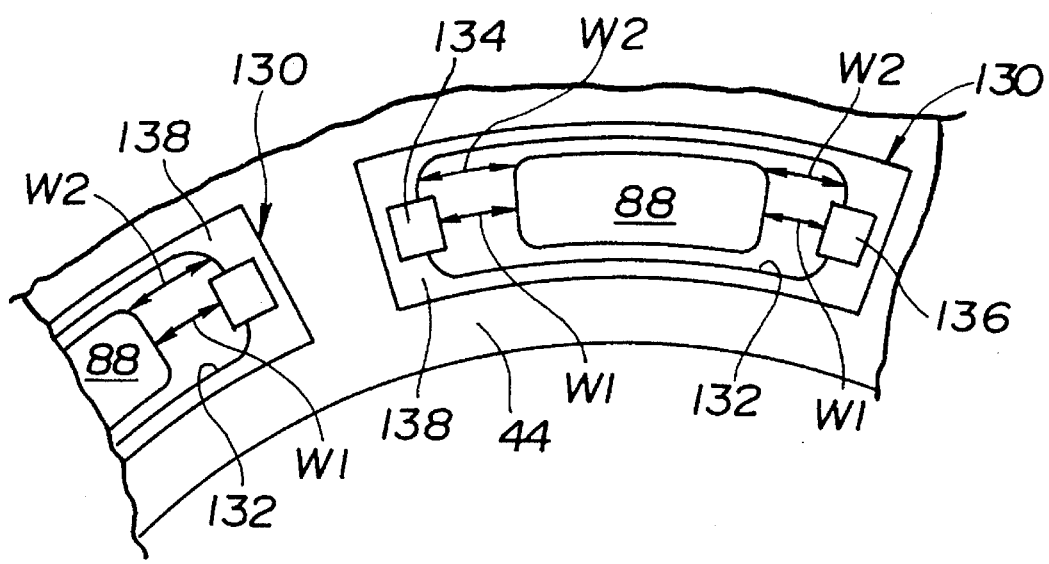
FIG. 6 is a fragmentary view of a third embodiment.

Still another form of a cushion 130 is illustrated in FIG. 6. The cushion 130 is attached to a disc 44 and has a plurality of windows 132 receiving therein friction blocks 88, respectively. The cushion 130 includes a plurality pairs of first pads 134 and 136 and also includes a plurality of second pads 138 defining the plurality of windows 132, respectively. Each of the plurality pairs of first pads 134 and 136 is attached to circumferentially spaced edges of the second pad 138 defining one of the plurality of windows 132. The plurality pairs of first pads 134 and 136 are integral with the second plurality of second pads 138, respectively. The first pads 134 and 136 are made of felt tissue of para aromatic polyamide fiber. The pads 138 are made of TEFLON™ (Registered Trademark of E. I. du Pont de Nemours & Co., Inc.) which has low friction.

The friction blocks 88 have, between the corresponding pairs of first pads 134 and 136, a play 2×W1, in the circumferential direction of the disc 44. The friction blocks 88 have, within the corresponding windows 132, a second play 2×W2, which is longer than the first mentioned play 2×W1, in the circumferential direction of the disc 44. According to this embodiment, the second pads 138 smoothly guide movement of the friction blocks 88 since the windows 132 are surrounded by the second pads 138 made of low friction material. It is also understood that this embodiment of cushion 130 is easy to install since the first pads 134 and 136 are integral with one of the second pads 138.

What is claimed is:

1. A torsional damper comprising:

first and second damper elements which are resiliently coupled by a spring arrangement, said first damper element having a radially extending wall and, said second damper element having a plurality of windows;

a plurality of friction blocks received respectively in said plurality of windows;

a spring element biasing said plurality of friction blocks against said radially extending wall of said first damper element; and a cushion attached to an edge of one of said plurality of windows, said cushion contacting said plurality of friction blocks when said first damper element is rotated relative to said second damper element by a predetermined angle;

wherein said cushion includes a plurality of pairs of first pads, each pair being attached to a corresponding one of said plurality of windows, and a plurality of pairs of second pads, each pair being attached to a corresponding one of said plurality of windows.

2. A torsional damper as claimed in claim 1, wherein said first damper element rotates relative to said second damper element by a first predetermined angle before a friction block contacts a corresponding pair of said second pads.

3. A torsional damper as claimed in claim 2, wherein said first damper element rotates relative to said second damper element by a second predetermined angle, larger than the first predetermined angle, before a friction block contacts a corresponding pair of said second pads.

4. A torsional damper as claimed in claim 3, wherein said first pads are less rigid than said second pads.

5. A torsional damper as claimed in claim 4, wherein said first pads are resilient enough to allow said second pads to directly engage the corresponding friction blocks.

6. A torsional damper as claimed in claim 5, wherein said first pads are responsible for a first stage of shock absorption, and said first and second pads are, in cooperation with each other, responsible for a second stage of the shock absorption.

7. A torsional damper comprising:

first and second damper elements which are resiliently coupled by a spring arrangement, said first damper element having a radially extending wall and, said second damper element having a plurality of windows;

a plurality of friction blocks received respectively in said plurality of windows;

a spring element biasing said plurality of friction blocks against said radially extending wall of said first damper element; and a cushion attached to an edge of one of said plurality of windows, said cushion contacting said plurality of friction blocks when said first damper element is rotated relative to said second damper element by a predetermined angle;

wherein said cushion includes a plurality of pairs of first pads and a plurality of second pads respectively defining said plurality of windows.

8. A torsional damper as claimed in claim 7, wherein each of said plurality of pairs of first pads is attached to one of said plurality of pairs of second pads.

9. A torsional damper as claimed in claim 8, wherein said plurality pairs of first pads are integral with said second plurality of second pads, respectively.

10. A torsional damper as claimed in claim 9, wherein said first pads are made of felt tissue of para aromatic polyamide fiber.

11. A torsional damper as claimed in claim 7, wherein said plurality of second pads are comprised of a low friction material.

* * * * *